J. S. BLYMYER.
CANE JUICE EVAPORATOR.
No. 110,192.             Patented Dec. 20, 1870.
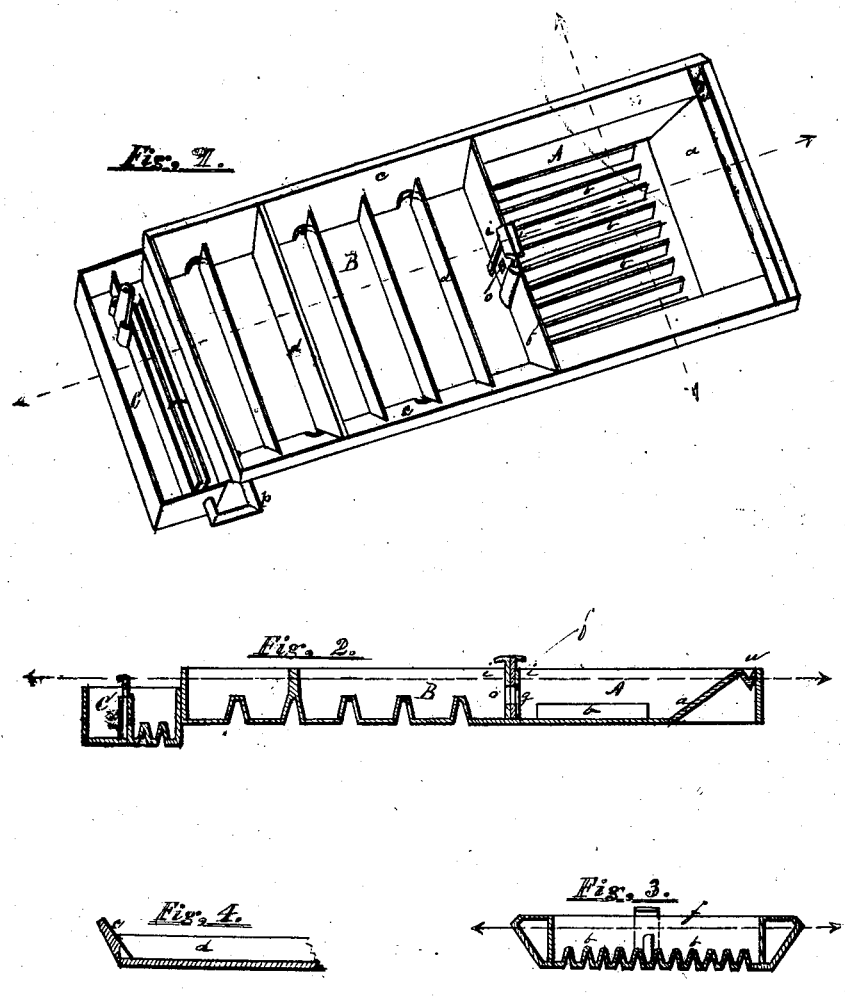

United States Patent Office.

JOHN S. BLYMYER, OF MANSFIELD, OHIO.

Letters Patent No. 110,192, dated December 20, 1870; antedated December 17, 1870.

---

IMPROVEMENT IN CANE-JUICE EVAPORATORS.

---

The Schedule referred to in these Letters Patent and making part of the same.

---

I, JOHN S. BLYMYER, of Mansfield, in the county of Richland, State of Ohio, have invented certain Improvements in Cane-Juice Evaporators, of which the following is a specification.

Nature and Objects of Invention.

My invention relates to evaporating-pans in which the juice is received continuously into one end of the pan, and is caused to flow back and forth over the bottom through a series of transverse channels, formed by ledges projecting up from the pan bottom; and It consists in the mode of constructing the pan, that is, in making the sides of the pan inclined, for greater convenience in retaining and removing scum, in extending the transverse ledges entirely across the pan and uniting them at each end with the inclined sides, and in providing passages around the alternate ends of the ledges, for the continuous flow of juice from one transverse channel to the next through the whole series, the construction and arrangement being such that no part of the pan-bottom in which solder is used is exposed to the direct action of fire.

My invention also consists in combining, with an evaporating-pan in which the juice is evaporated in a continuous transverse current, a heater and defecator, the bottom of which has a series of hollow corrugations, which do not extend to either side or end, and which project up from the general level of the bottom, as herein shown, affording great heating surface in a small compass, and without cellular depressions, such as is formed when the corrugations are developed downward instead of upward from the general level of the bottom, said cellular depressions being objectionable, as they accumulate and retain sediment and are not easily cleaned out.

My invention also consists in combining, with an evaporating-pan in which the juice is evaporated in a continuous transverse current, a finisher, arranged upon a lower level than the level of the main body of the pan, thereby providing for conveniently maintaining a greater depth of juice in this compartment than is appropriate in the main evaporator.

My invention also consists in controlling the opening or passage between the different compartments of an evaporator, in which the juice is evaporated in a continuous current by a double gate, constructed and arranged in the manner and for the purpose hereinafter specified.

Description of Accompanying Drawing.

Figure 1 is a parallel perspective of an evaporating apparatus in which my improvements are embodied.

Figure 2 is a longitudinal section through the center of the same.

Figure 3 is a transverse section through the heater and defecator, showing the corrugations in the bottom of same.

Figure 4 is a detail, showing the juice passage around the end of one of the transverse ledges formed by carving out a portion of the wood of the sides.

General Description.

The evaporating apparatus consists of three compartments.

A, the heater and defecator;

B, the concentrator; and

C, the finisher.

Three sides of the heater and defecator are vertical, while the fourth side, $a$, is inclined, as represented, and a trough, $u$, for scum, is provided at its top edge $b\ b$ are the corrugations, developed upward from the general level of the bottom, and without extending to either side or end.

The concentrator B has inclined sides $c\ c$.

$d\ d$ are the transverse ledges, extending from side to side, and joining the inclined sides.

$e\ e$ are the juice passages around the ends of the ledges $d$, made around alternate ends upon alternate sides, providing a continuous zigzag or transverse channel from one side of the concentrator to the other, and from one transverse channel to another, through the whole series.

The finisher C is arranged upon a lower level than the concentrator B, as represented in fig. 2, and is supplied with juice from the latter by the side pipe $p$, which may have a cock controlling the flow; or any other appropriate passage for the juice from B to C may be provided.

Through the partition $f$, which separates compartments A and B, an opening, $g$, for the passage of juice, is made, and this is controlled by double gates $i$, which slide up and down in appropriate grooves.

These gates have each an opening, $o$, up a short distance from their lower edges. When the gates are both closed entirely down these openings coincide and form a passage for juice, and for all that may be contained in the heater and defecator above the lower line of the double opening $o$, but retaining in this compartment all that may be below this line, thus maintaining a uniform depth of juice in the heater; but one of the gates may be raised while the other is left stationary, and the effect of this will be to raise the lower line of the passage $o$, and thus cause the retention of a greater depth of juice in the compartment A; or both gates $i$ may be raised simultaneously, drawing from the bottom of A, and, if necessary, draining it entirely.

In practical operation, the cane-juice is admitted continuously by a regulated stream into heater and defecator A, where an appropriate depth of juice is maintained by the double gates *i*. The concentrator B is supplied from A with barely juice enough to keep the bottom covered by the flowing currents. The finisher C is supplied from B continuously with as much juice as may be necessary in this department, where the operation of finishing off to sirup or sugar is performed; but as the juice becomes dense and loses its mobility, a somewhat greater depth of juice is required than in the earlier stages of concentration. I provide for this by arranging the finisher upon a lower level, as shown and explained.

Claims.

I claim as my invention—

1. Constructing the concentrator B with inclined sides *c c*, and transverse ledges *d d* reaching from side to side and joining the inclined sides, with juice-passages *e e* around alternate ends of the ledges, said passages being formed by carving out a portion of the wood appropriately, substantially as illustrated and explained.

2. In combination with a cane-juice evaporator, in which the juice is evaporated in a continuous transverse current, a heater and defecator, having hollow corrugations developed upward from the general level of the bottom, and not extending to either side or end, substantially as shown and described.

3. In combination with a cane-juice evaporator, in which the juice is evaporated in a continuous transverse current, a finisher, arranged upon a lower level, substantially as and for the purpose explained.

4. In a compartment evaporator in which the juice is provided to flow continuously from one compartment to another, the double gate *i*, with openings *o*, constructed and arranged substantially as herein described, and for the purpose specified.

J. S. BLYMYER.

Witnesses:
ABEL R. PROCTOR,
CHAS. H. FICK.